W. S. & M. H. PATERSON.
LAWN MOWER AND LAWN TRIMMER.
APPLICATION FILED MAY 12, 1914.
1,222,241.
Patented Apr. 10, 1917.
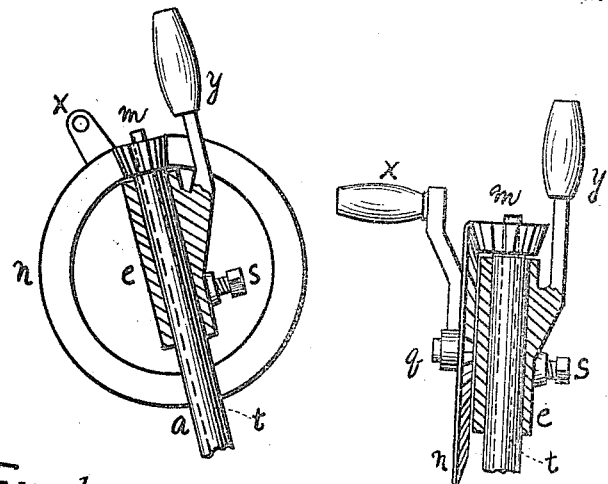
Fig 1.     Fig 2.
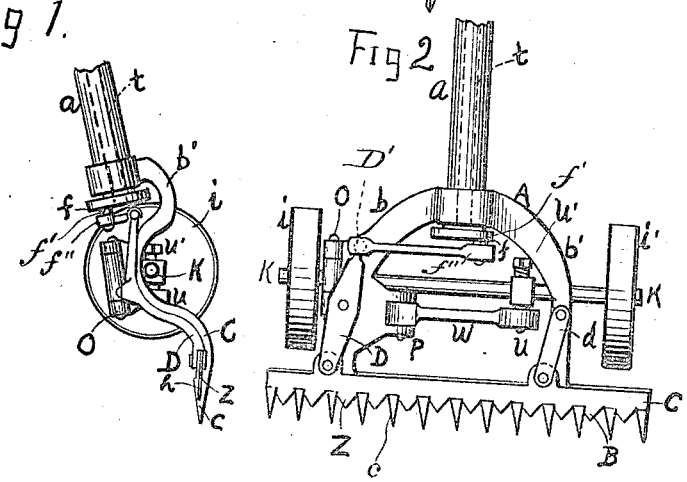
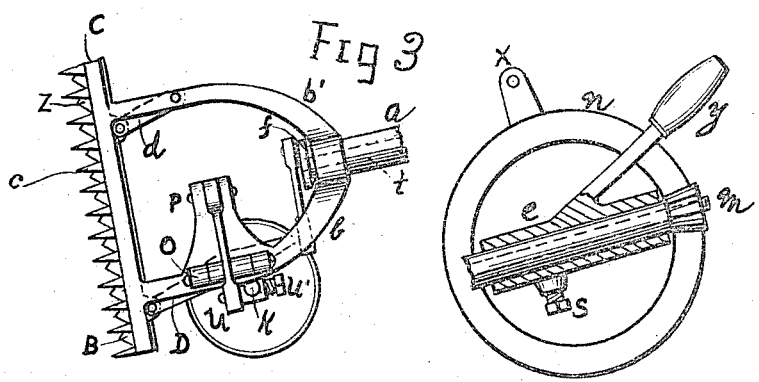
Fig 3.
Witnesses
Inventors
William S. Paterson
May H. Paterson

UNITED STATES PATENT OFFICE.

WILLIAM S. PATERSON AND MAY H. PATERSON, OF OAKLAND, CALIFORNIA, ASSIGNORS OF ONE-HALF TO GEORGE R. ANDREWS, OF FRESNO, CALIFORNIA.

LAWN-MOWER AND LAWN-TRIMMER.

1,222,241.   Specification of Letters Patent.   Patented Apr. 10, 1917.

Application filed May 12, 1914. Serial No. 338,115.

*To all whom it may concern:*

Be it known that we, WILLIAM S. PATERSON and MAY H. PATERSON, citizens of the United States, and residents of the city of Oakland, county of Alameda, and State of California, have invented a new and useful Lawn-Mower and Lawn-Trimmer, of which the following is a specification.

Our invention relates generally to improvements in a lawn mower and trimmer combined of the type which runs on wheels and which has a serrated cutter blade and cutter bar guide and means for moving such cutter blade. More specifically our invention relates to details of construction which permit the adjustment of the cutter bar up or down in relation to the carriage, adjustments of the crank for applying power to the mower, the curved motion of the cutter blade and other objects which will hereinafter more specifically appear.

In the drawing accompanying this specification Figure 1 is a side elevation of the lawn mower with parts broken away. Fig. 2 is a top view of the lawn mower with parts broken away and sleeve $e$ shown in section, and Fig. 3 is a bottom view thereof with the handle broken away and sleeve $e$ shown in section.

In said figures A is the main frame of the mower which consists of a tube $a$, one end of which terminates in a fork consisting of branches $b$ and $b'$. K is an axle, and $i$ and $i'$ are wheels thereon, constituting the carriage on which the mower is mounted. The main frame A is attached to such carriage by means of a hinge $o$, which connects branch $b$ of said frame A with one end of axle $k$. $u$ is a block constructed to slide on axle $k$ having a set screw $u'$. $w$ is an arm which is pivoted at $p$ to one end of branch $b$ and at the other end to sliding block $u$. It will be noted that by sliding block $u$ toward hinge $o$, the pivot $p$ will be raised, thus tilting frame A and the cutter $c$ carried thereon. The cutter $c$ can be operated at any angle at which the frame A can be tilted. The object of this construction is to tilt the cutter $c$ to easily trim the edge of the lawn under conditions where the surface of the lawn is on a slightly higher level than the earth immediately surrounding the lawn. $u'$ is a set screw by which block $u$ can be fastened securely to the axle $k$. The one wheel can roll on the lawn, and the other wheel can roll on the lower level around the edge of the lawn, and by tilting the cutter the edge can be trimmed without running the cutter into the earth.

We have constructed a shaft $t$ to rotatably fit into tube $a$ and to extend the entire length thereof. At the upper end of shaft $t$ we have attached a beveled gear $m$ which is engaged by a bevel gear $n$. Gear $n$ is turned preferably by hand power applied to crank $x$. We have attached gear $n$ by means of wrist pin $q$ to a sleeve $e$. Sleeve $e$ is adapted to fit over the end of tube $a$ and can be turned around thereon. The object of this construction is to permit gear $n$ (and attached handle $x$) to be adjustable on tube $a$, so it can be placed where it is most convenient to operate. $s$ is a set screw adapted to clamp sleeve $e$ to tube $a$. $y$ is a handle attached to sleeve $e$.

The cutting mechanism consists of a serrated cutter blade B and a cutter bar C. The cutters on the serrated cutter blade B are shown as $z$. Cutter bar C has a plurality of guards $c$ thereon. Each of said guards has a horizontal interstice $h$ through which cutters $z$ are adapted to slide. Cutter bar C is rigidly attached near one end to branch $b$ and near the other end to branch $b'$. $f$ is a disk integrally connected with the shaft $t$ carrying a pin $f'$ set eccentrically on the disk on which a pitman rod $f''$ is journaled, connecting the pin $f'$ with a rocker D by means of a ball and socket joint D'. Rocker D is pivoted between the ends thereof to branch $b$, one end thereof being pivoted to pitman rod $f$ and the other end to cutter blade C. It will be observed that by turning gear $n$, the motion is transmitted to serrated cutter blade B, through shaft $t$, disk $f$, pitman rod $f''$, and rocker D, giving it a movement in which each cutter $z$ thereon describes a small arc of a circle. The object in imparting this movement is to make the cutter blade cut easier.

To better support cutter blade B we have pivoted one end of a member $d$ to branch $b'$ and the other end to cutter blade B opposite the end to which rocker D is pivoted. In our construction the distance between the pivots attaching member $d$ to branch $b'$ and to cutter blade B should be the same as the distance between the pivots connecting rocker D to branch $b$ and to serrated cutter blade B.

We are aware that some features of the mower we have herein described are old.

What we claim as our invention and upon what we desire Letters Patent is:

1. In a lawn mower, the combination of a frame consisting of a tube terminating at the bottom in a member with two branches, a shaft journaled in said handle, means for communicating motion thereto, a cutter bar rigidly attached to said member with the branches, guards on said cutter bar having lateral interstices therein in a common plane, a serrated cutter blade movable within said interstices, means for transmitting motion from said shaft to the serrated cutter blade, a truck consisting of an axle and a wheel on each end thereof, a hinged member connecting one of said branched members with the adjacent end of the axle, a block slidably disposed on the axle, an arm pivoted at one end to said block and at the other end to the branch hinged to the axle, and means for attaching said block to said axle.

2. In a lawn mower, the combination of a frame consisting of a tube terminating at one end in a member with two branches, a shaft journaled in said handle, means at the upper end of said shaft for communicating rotary motion to the shaft, a cutter bar having guards with interstices therein attached to the member with the branches, a cutter blade movable within such interstices, means for transmitting motion from said shaft to the cutter blade, a truck consisting of an axle, with a wheel on each end thereof, hinged means for attaching the axle to one of the branches, and means for fastening the branch not thus hinged, to said axle.

WILLIAM S. PATERSON.
MAY H. PATERSON.

Witnesses:
JAS. S. NAISMITH,
G. WIMMITT.